(12) United States Patent
Coaplen et al.

(10) Patent No.: US 12,437,127 B2
(45) Date of Patent: Oct. 7, 2025

(54) TOPOLOGICALLY OPTIMIZED COMPONENT DESIGN

(71) Applicant: Fox Factory, Inc., Duluth, GA (US)

(72) Inventors: Joshua Coaplen, Asheville, NC (US); Wesley E. Allinger, Santa Cruz, CA (US); Daniel McCormick, Santa Cruz, CA (US); Paul Hammerstrom, Milford, NH (US)

(73) Assignee: Fox Factory, Inc., Duluth, GA (US)

( * ) Notice: Subject to any disclaimer, the term of this patent is extended or adjusted under 35 U.S.C. 154(b) by 773 days.

(21) Appl. No.: 17/706,435

(22) Filed: Mar. 28, 2022

(65) Prior Publication Data
US 2022/0318444 A1 Oct. 6, 2022

Related U.S. Application Data

(60) Provisional application No. 63/167,850, filed on Mar. 30, 2021.

(51) Int. Cl.
*G06F 30/15* (2020.01)
(52) U.S. Cl.
CPC .................... *G06F 30/15* (2020.01)
(58) Field of Classification Search
CPC ........................................................ G06F 30/15
USPC ............................................................. 703/8
See application file for complete search history.

(56) References Cited

U.S. PATENT DOCUMENTS

| | | | |
|---|---|---|---|
| 9,975,595 B2 | 5/2018 | Galasso et al. | |
| 10,850,793 B2 | 12/2020 | Galasso | |
| 12,124,995 B2 * | 10/2024 | Bujny | G06Q 10/101 |
| 2019/0352743 A1 * | 11/2019 | Lu | B22F 10/18 |
| 2020/0342067 A1 | 10/2020 | Yu et al. | |

FOREIGN PATENT DOCUMENTS

CN 112395685 A 2/2021

OTHER PUBLICATIONS

Jeremy Smith, Redesigning a Bicycle Crank Arm for Metal Additive Manufacturing by Applying DFMAM Guidelines To the Topology Optimization Process, Mar. 2019. (Year: 2019).*
Decision of Rejection for TW Application No. 111112265, Mailed Jun. 13, 2023, 11 Pages.
European Search Report for European Application No. 22165212.6 , 7 pages, Jul. 13, 2022.
Hoglund, "Topology Optimization Method for Carbon Fiber-Reinforced Fused Filament Fabrication", Aug. 1, 2016, 1-169 Pages.

* cited by examiner

*Primary Examiner* — Justin C Mikowski

(57) ABSTRACT

A method for topologically optimized component design is disclosed. The method receives at least one application parameter for a component and at least one specification for the component. The at least one application parameter and the at least one specification are utilized to generate a topologically optimized component design from at least one material.

7 Claims, 7 Drawing Sheets

TOPOLOGICALLY OPTIMIZED COMPONENT DESIGN

CROSS-REFERENCE TO RELATED APPLICATIONS (PROVISIONAL)

This application claims priority to and benefit of U.S. Provisional Patent Application No. 63/167,850 filed on Mar. 30, 2021, entitled "TOPOLOGICALLY OPTIMIZED COMPONENT DESIGN" by Coaplen et al., and assigned to the assignee of the present application, the disclosure of which is hereby incorporated by reference in its entirety.

FIELD OF THE INVENTION

Embodiments of the invention generally relate to the field of vehicle frames, support members, and the like.

BACKGROUND OF THE INVENTION

Vehicle components, frames, members, suspension systems, and the like, must resist forces tending to twist and/or bend those structures. Further, it is desirable that such structures be maintained in position relative to one another. That often means that the structures and/or their connection to one another need to be suitably reinforced. As such, these structures are manufactured to meet a number of structural integrity requirements. These requirements can include the ability to support a structural load (e.g., a weight, force, etc.) without breaking or failing.

Figure 1:
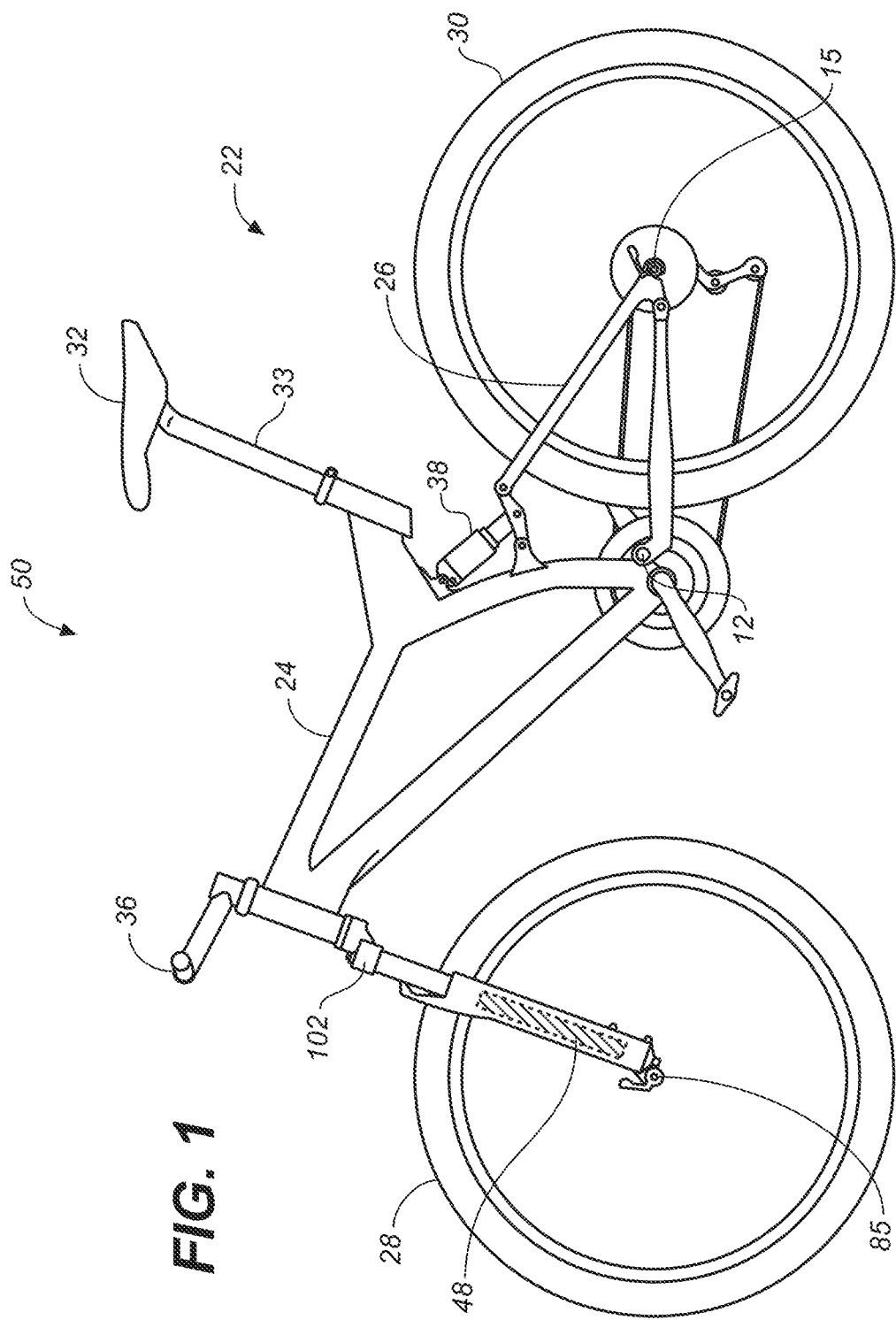
FIG. 1 is a perspective view of a bicycle with at least one topologically optimized component design, in accordance with an embodiment.

The drawings referred to in this description should be understood as not being drawn to scale except if specifically noted.

DESCRIPTION OF EMBODIMENTS

The detailed description set forth below in connection with the appended drawings is intended as a description of various embodiments of the present invention and is not intended to represent the only embodiments in which the present invention may be practiced. Each embodiment described in this disclosure is provided merely as an example or illustration of the present invention, and should not necessarily be construed as preferred or advantageous over other embodiments. In some instances, well known methods, procedures, objects, and circuits have not been described in detail as not to unnecessarily obscure aspects of the present disclosure.

In the following discussion, and for purposes of clarity, a bicycle is utilized as the example vehicle. However, in another embodiment, the vehicle could be one any one of a variety of vehicles such as, but not limited to, a bicycle, a motorized bicycle, a motorcycle, a watercraft (e.g., boat, jet ski, PWC, etc.), a snow machine, a single wheeled vehicle, a multi-wheeled vehicle, a side-by-side, an on-road and/or off-road vehicle, an aircraft, a personal light electric vehicle (PLEV), or the like. In general, a motorized bike can include a bike with a combustion motor, an electric bike (e-bike), a hybrid electric and combustion bike, a hybrid motor and pedal powered bike, and the like.

Often, bicycle components are designed with a large performance window to cover a broad scope of consumers and ride types. For example, a mountain bike sold at a shop may be designed with components manufactured to meet the needs of intermediate level riders with a body weight between 120-180 lbs. (for example). As such, a bike shop would be able to use the weight criteria to help guide the customer in the purchase of an appropriate bike with an appropriate level of component performance.

However, as the rider advances in skill, the performance requirements of one or more components of the bike will likely need to be upgraded. These upgrades can include aspects such as stronger structures, lighter structures, etc. Moreover, depending upon the type of bike and the type of terrain, features, jumps, bumps, performance expectations, and the like, there may be a need to only upgrade one or some components. In some extreme performance cases, there may be a desire to find even a very small weight and/or strength advantage that would allow the rider to be just a bit faster, jump a bit higher, gain just a bit of top end speed, etc. than a fellow competitor.

In one embodiment, the term topological optimization is used. In general, topological optimization can include optimization methods for material usage that can be additive, subtractive, or both additive and subtractive. It should be appreciated that although topological optimization is used herein, in one embodiment, the process could be referred to as a generative design, or other terminology to indicate methods for material usage that are additive and/or subtractive.

In one embodiment, additive refers to the process of adding (or growing) material to make a part. An example of an additive process is a 3D printer. In one embodiment, subtractive refers to the process of removing material from an existing chunk of material to make a part. An example of a subtractive process is a milling machine milling a block of material down to form a part.

In one embodiment, the topological optimized or generative designed part can include lattice structures.

Referring now to FIG. 1, a schematic side view of a bicycle 50 having a topologically optimized component design incorporated therewith is shown in accordance with an embodiment. In one embodiment, bicycle 50 has a main frame 24 with a suspension system comprising a swing arm 26 that, in use, is able to move relative to the rest of main frame 24; this movement is permitted by, inter alia, damper 38. The front fork assembly 102 also provide a suspension function via a damper 48 in at least one fork leg; as such the bicycle 50 is a full suspension bicycle (such as an ATB or mountain bike).

However, the embodiments described herein are not limited to use on full suspension bicycles. In particular, the term "suspension system" is intended to include vehicles having front suspension only, rear suspension only, seat suspension only, a combination of two or more different suspension types, and the like.

In one embodiment, swing arm 26 is pivotally attached to the frame 24 at pivot point 12. Although pivot point 12 is shown in a specific location, it should be appreciated that pivot point 12 can be found at a different location. In a hard tail bicycle embodiment, there would be no pivot point 12. In one embodiment of a hardtail bicycle, main frame 24 and swing arm 26 would be formed as a fixed frame.

Bicycle 50 includes a front wheel 28 which is coupled with the front fork assembly 102 via axle 85. In one embodiment, a portion of front fork assembly 102 (e.g., a steerer tube) passes through the bicycle main frame 24 and couples with handlebars 36. In so doing, the front fork assembly and handlebars are rotationally coupled with the main frame 24 thereby allowing the rider to steer the bicycle 50.

Bicycle 50 includes a rear wheel 30 which is coupled to the swing arm 26 at rear axle 15, and a rear damping assembly (e.g., damper 38) is positioned between the swing arm 26 and the frame 24 to provide resistance to the pivoting motion of the swing arm 26 about pivot point 12. In one embodiment, a saddle 32 is connected to the main frame 24 via a seatpost 33. In one embodiment, seatpost 33 is a dropper seatpost. In one embodiment, one or more of fork damper 48, damper 38, seatpost 33, handlebars 36, and/or the like include one or more active damping components.

Figure 2:
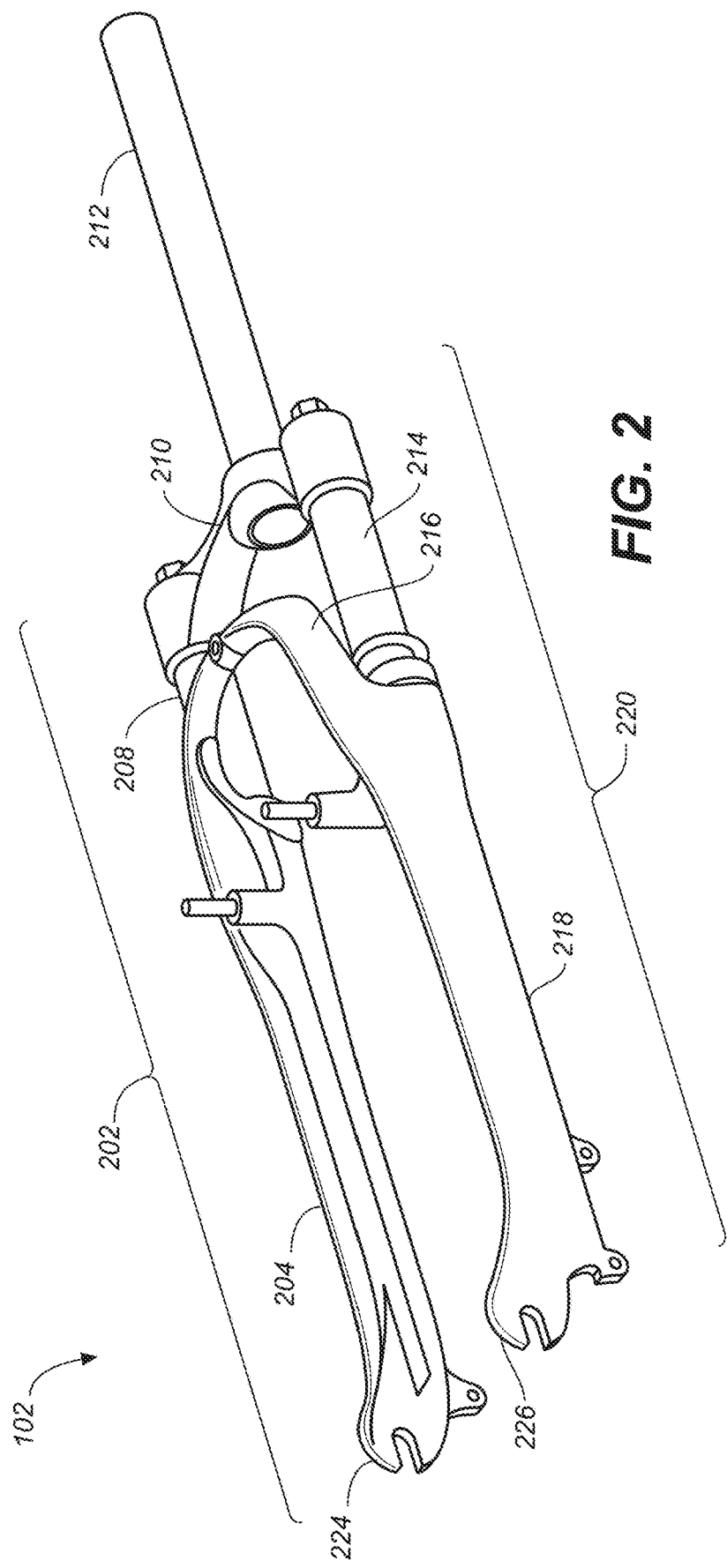
FIG. 2 is a perspective view of a front fork assembly having a topologically optimized component design incorporated therewith, in accordance with one embodiment.

Referring now to FIG. 2, a perspective view of the front fork assembly 102, as being detached from the bicycle 50 of FIG. 1, is shown in accordance with an embodiment. The front fork assembly 102 include right and left legs, 202 and 220, respectively, as referenced by a person in a riding position on the bicycle 50. The right leg 202 includes a right upper tube 208 telescopingly received in a right lower tube 204. Similarly, the left leg 220 includes a left upper tube 214 telescopingly received in a left lower tube 218.

In one embodiment, the telescoping of the legs is inverted. That is, the right lower tube 204 of right leg 202 is telescopingly received in the right upper tube 208. Similarly, the left lower tube 218 of left leg 220 is telescopingly received in the left upper tube 214.

A crown 210 connects the right upper tube 208 to the left upper tube 214 thereby connecting the right leg 202 to the left leg 220 of the front fork assembly 102. In addition, the crown 210 supports a steerer tube 212, which passes through, and is rotatably supported by, the frame 24 of the bicycle 50. The steerer tube 212 provides a means for connection of the handlebar assembly 36 to the front fork assembly 102.

Each of the right lower tube 204 and the left lower tube 218 includes dropouts 224 and 226, respectively, for connecting the front wheel 104 to the front fork 102 via a front axle 85. An arch 216 connects the right lower tube 204 and the left lower tube 218 to provide strength and minimize twisting thereof.

Figure 3:
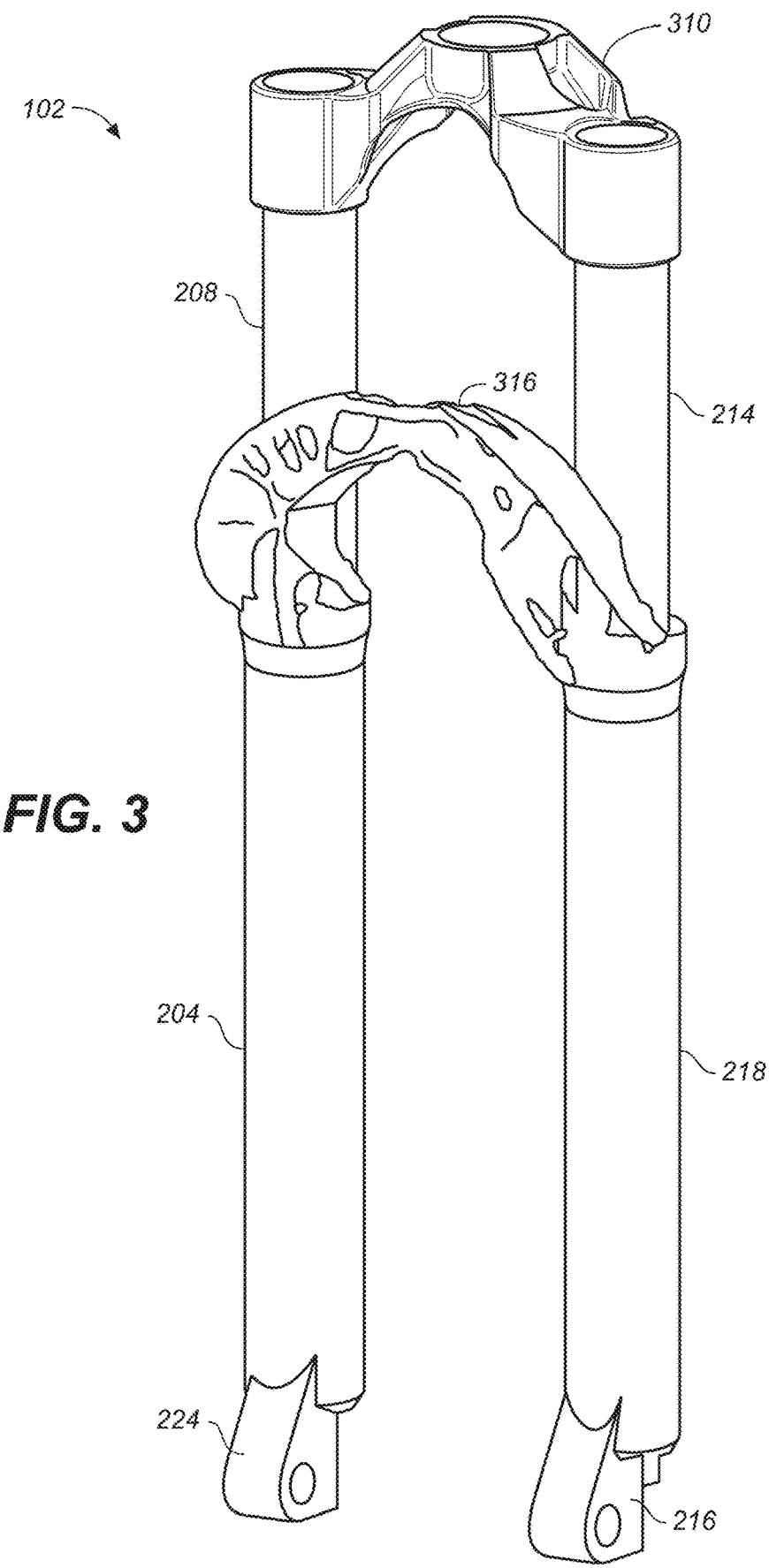
FIG. 3 is a perspective view of the relevant portions of the front fork assembly of FIG. 2 showing a number of topologically optimized design components incorporated therewith, in accordance with one embodiment.

With reference now to FIG. 3, a perspective view of the relevant portions of the front fork assembly 102 showing a number of topologically optimized design components incorporated therewith is shown in accordance with one embodiment. In one embodiment, front fork assembly 102 includes a topologically optimized fork arch 316. In one embodiment, front fork assembly 102 includes a topologically optimized fork crown 310. In one embodiment, front fork assembly 102 includes a topologically optimized fork arch 316 and a topologically optimized fork crown 310.

Figure 4A:
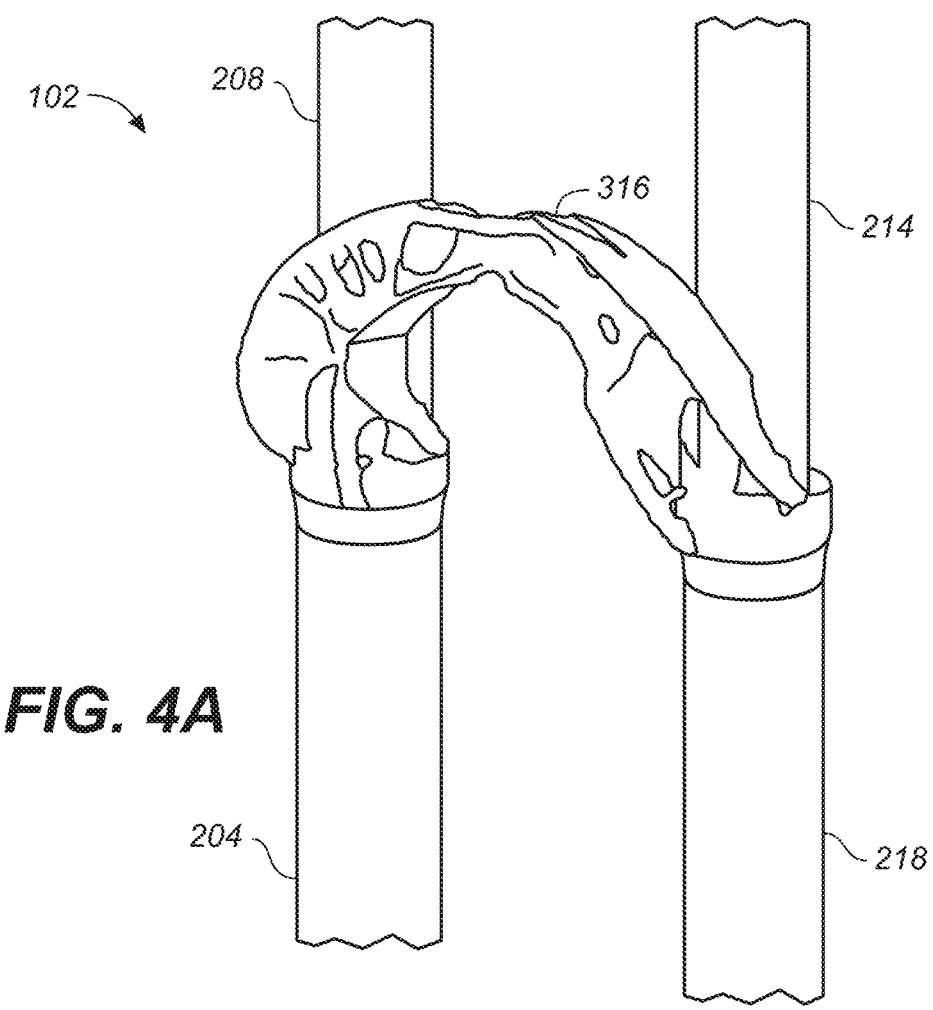
FIG. 4A is a perspective view of the relevant portions of the front fork assembly having a topologically optimized fork arch design, in accordance with one embodiment.

Referring now to FIG. 4A, a perspective view of the relevant portions of the front fork assembly 102 having a topologically optimized fork arch 316 is shown in accordance with one embodiment. In one embodiment, the topologically optimized fork arch 316 is coupled with right lower tube 204 and left lower tube 218. In an inverted fork embodiment, the topologically optimized fork arch 316 would be coupled with right upper tube 208 and left upper tube 214.

In the following discussion, for purposes of clarity, the topologically optimized fork arch 316 will be coupled to a fork assembly 102 in a standard telescoping configuration. However, it should be appreciated that the topologically optimized fork arch 316 could be coupled to a front fork assembly 102 having an inverted orientation in the same or similar configuration. In one embodiment, the topologically optimized fork arch 316 could be coupled to a front fork assembly 102 in front of the steering axis (as seen by a rider). In one embodiment, the topologically optimized fork arch 316 could be coupled to a front fork assembly 102 behind the steering axis (as seen by a rider).

In one embodiment, topologically optimized fork arch 316 is used for coupling the fork legs together at a second location offset from the crown. In one embodiment, topologically optimized fork arch 316 provides improved alignment of the left and right fork legs of a bicycle by allowing for mid-assembly horizontal, vertical and rotational adjustment of the fork legs via the topologically optimized fork arch 316.

In one embodiment, the topologically optimized fork arch 316, the right lower tube 204 and left lower tube 218 are manufactured as a single piece.

In one embodiment, the topologically optimized fork arch 316 is formed separately from the fork legs, and/or of a different material. In other words, the topologically optimized fork arch 316, is manufactured separately from the right lower tube 204 and left lower tube 218.

In one embodiment, the topologically optimized fork arch 316 is formed with at least one lower tube as a single piece. In one embodiment, the second lower tube is attached afterward, e.g., during assembly.

In one embodiment, the topologically optimized fork arch 316 and/or the lower fork legs are made of castable material like magnesium, aluminum or titanium. In one embodiment, the topologically optimized fork arch 316 and/or the lower fork legs are made of fiber reinforced polymer (e.g. carbon and/or glass reinforced epoxy or PEEK or other polyarylenes) or any other suitable structural material providing a suitably high level of strength, stiffness and impact resistance or any suitable combination thereof.

Further discussion of the operation and performance of a fork arch of a fork assembly can be found in U.S. Pat. No. 9,975,595, which is incorporated by reference herein, in its entirety.

In one embodiment, during assembly, the separate pieces may be individually adjusted to attain a desired alignment relative to each other. When properly aligned, the telescopic movement of the upper tubes within the lower tubes remains near or at the lowest friction level. Once the lower fork legs are positionally adjusted such that the lower fork legs are aligned within the same horizontal and vertical planes, then embodiments enable the stabilization of these adjusted positions through attachment features found in both the topologically optimized fork arch 316 and the lower fork legs (e.g., bolt holes, screw holes, glue cavities, etc.).

In one embodiment, if the components are manufactured as separate pieces, they may be fixedly coupled during assembly using a number of methods such as, but not limited to, topologically optimized fork arch 316 being coupled with the lower fork legs using horizontal and vertical attachment bars; topologically optimized fork arch 316 being coupled with lower fork legs using a matching positive and negative spline features and then glued, screwed, bolted, or otherwise fixedly coupled onto lower fork legs.

Figure 4B:
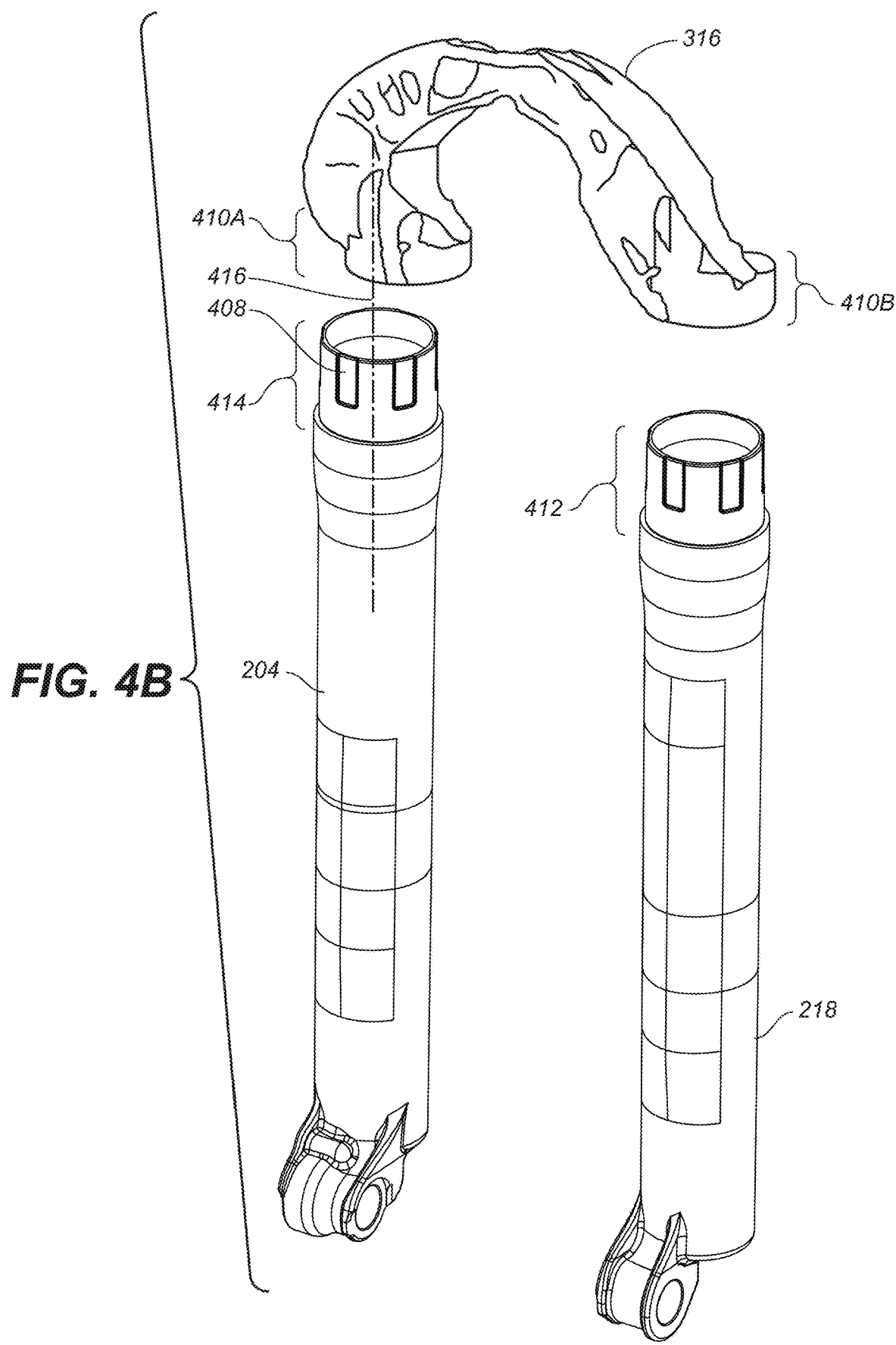
FIG. 4B is an exploded view of the topologically optimized fork arch design, a right lower tube and a left lower tube, in accordance with one embodiment.

With reference now to FIG. 4B, an exploded view of the topologically optimized fork arch 316, a right lower tube 204 and left lower tube 218 are shown in accordance with one embodiment.

In one embodiment, the right lower tube 204 has a first end 414 and the left lower tube 218 has a second end 412. The first end 414 includes a set of negative splines 408. A set of negative splines 408 is a depression within the first end 414 that is formed to lie parallel with the vertical axis 416. The topologically optimized fork arch 316 includes the right topologically optimized fork arch shoulder 410A and the left topologically optimized fork arch shoulder 410B. The inner surfaces (not shown) of the right topologically optimized fork arch shoulder 410A and the left topologically optimized fork arch shoulder 410B includes a set of positive splines configured for fitting within the set of negative splines 408. A set of positive splines is a raised vertically shaped block and is formed such that the raised positive spline fits within the negative spline depression.

In one embodiment, the raised positive splines are smaller in area than the negative spline depressions, such that when the right topologically optimized fork arch shoulder 410A and the left topologically optimized fork arch shoulder 410B are placed over the first end 414 and the second end 412 of the right lower tube 204 and the left lower tube 218, respectively, the right lower tube 204 and the left lower tube 218 may be rotated horizontally, vertically and rotationally within the fixture prior to a more permanent attachment mechanism being applied, such as, for example, glue.

Further discussion of the different methods and systems for coupling topologically optimized fork arch 316 with right lower tube 204 and left lower tube 218 can be found in U.S. Pat. No. 10,850,793 which is incorporated by reference herein, in its entirety.

Figure 5A:
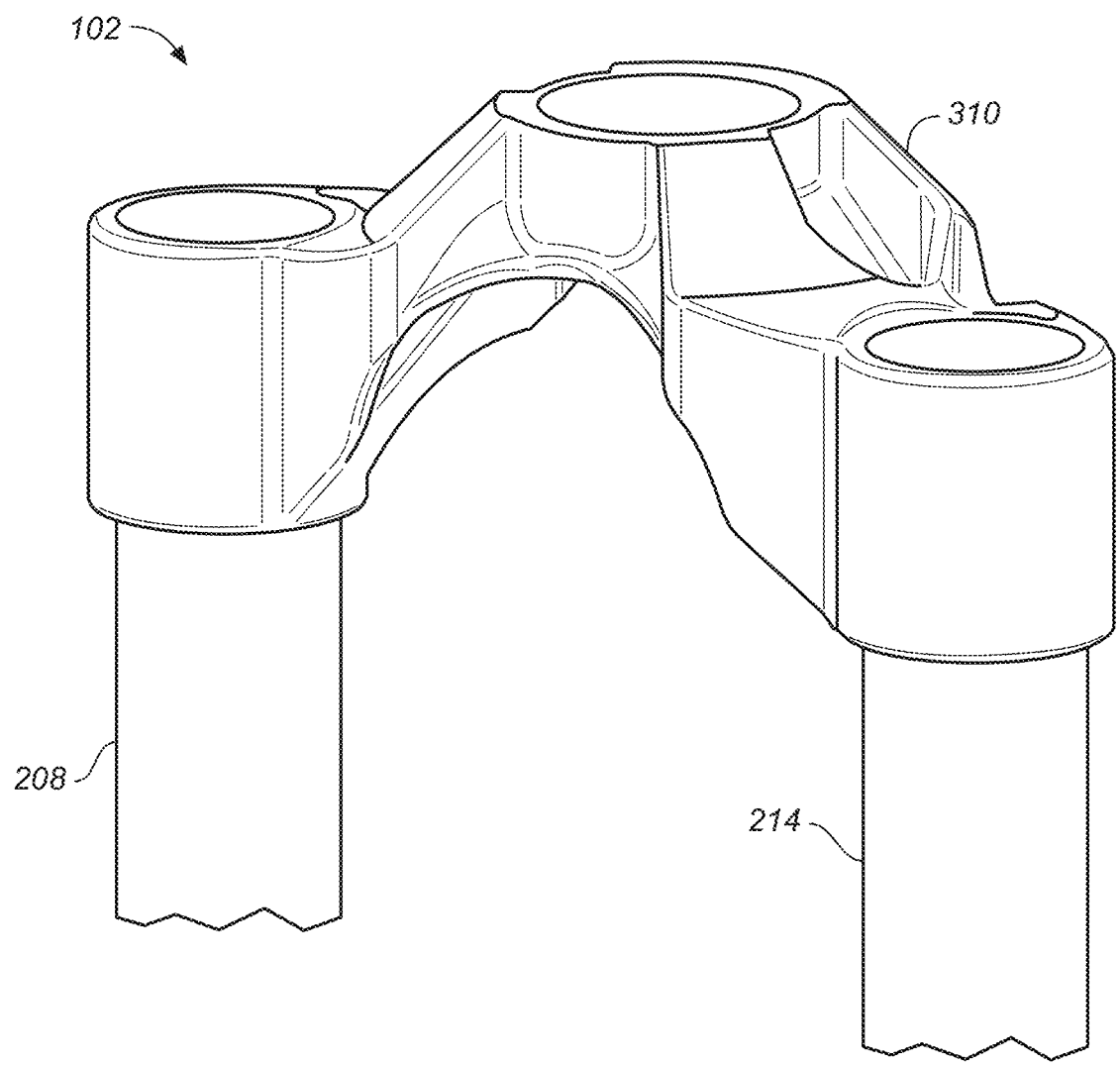
FIG. 5A is a perspective view of the relevant portions of the front fork assembly having a topologically optimized fork crown design, in accordance with one embodiment.

Referring now to FIG. 5A, a perspective view of the relevant portions of the front fork assembly 102 having a topologically optimized fork crown 310 is shown in accordance with one embodiment. In one embodiment, the topologically optimized fork crown 310 is coupled with right upper tube 208 and left upper tube 214.

Figure 5B:
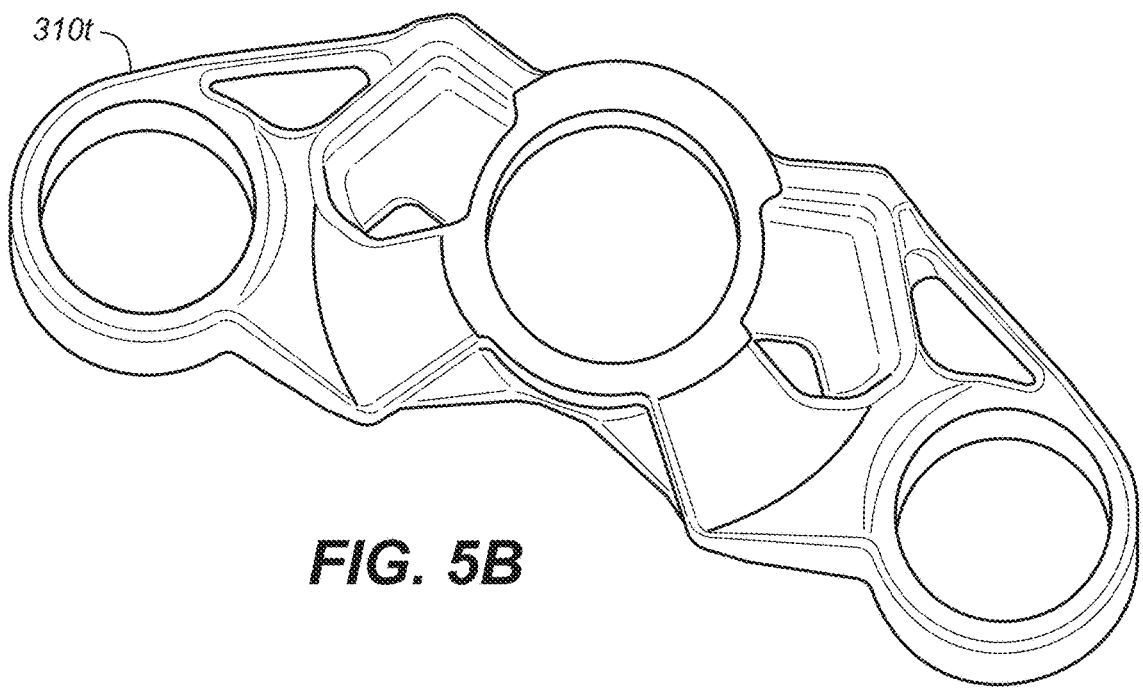
FIG. 5B is a perspective top view of the topologically optimized fork crown design, in accordance with one embodiment.
Figure 5C:
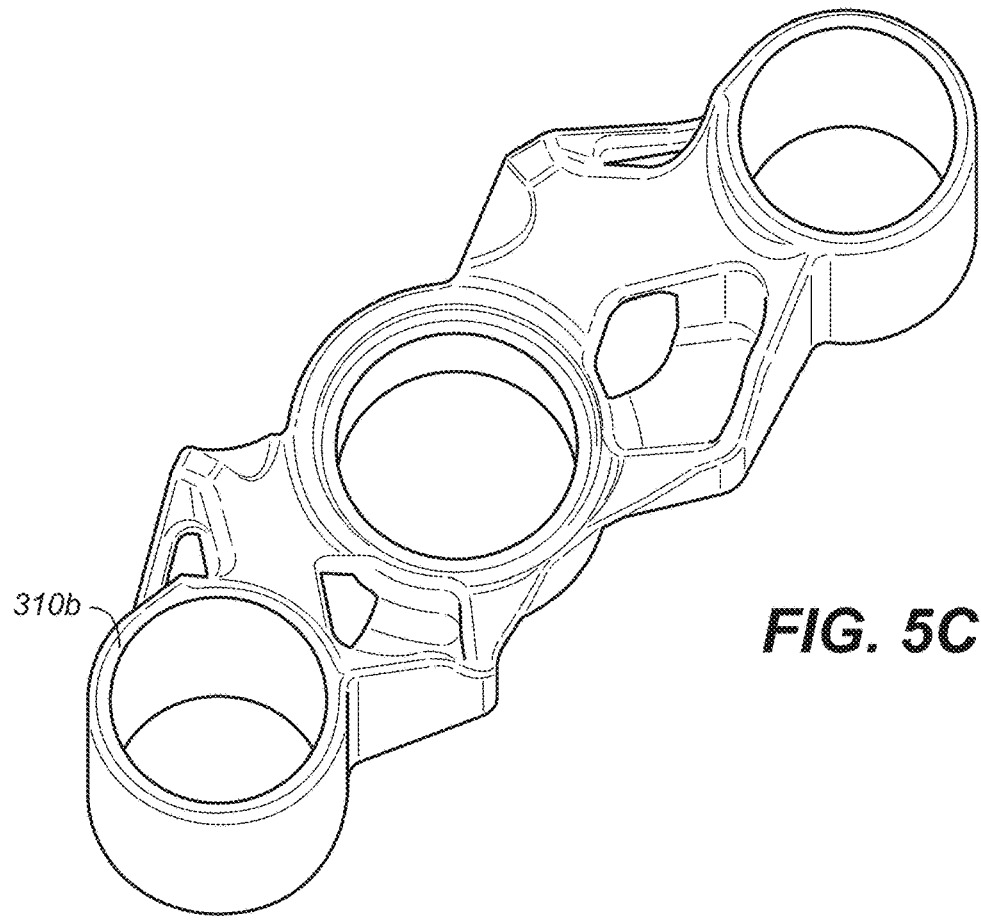
FIG. 5C is a perspective bottom view of the topologically optimized fork crown design, in accordance with one embodiment.

With reference now to FIG. 5B, a perspective top view of the topologically optimized fork crown 310t is shown in accordance with one embodiment. In FIG. 5C, a perspective bottom view of the topologically optimized fork crown 310b is shown in accordance with one embodiment.

In one embodiment, the topologically optimized fork crown 310, the right upper tube 208 and left upper tube 214 are manufactured as a single piece.

In one embodiment, the topologically optimized fork crown 310 is formed separately from the fork legs, and/or of a different material. In one embodiment, the topologically optimized fork crown 310 and/or the upper fork legs are made of castable material like magnesium, aluminum or titanium. In one embodiment, the topologically optimized fork crown 310 and/or the upper fork legs are made of fiber reinforced polymer (e.g. carbon and/or glass reinforced epoxy or PEEK or other polyarylenes) or any other suitable structural material providing a suitably high level of strength, stiffness and impact resistance or any suitable combination thereof.

Topologically Optimized Component Design

In one embodiment, such as in the topologically optimized fork arch 316, in order for the initial topologically optimized component design, the fork arch application has to be defined. Some examples of the parameters that should be defined include, but are not limited to, travel, wheel size, bike type, weight target, stiffness target, and the like.

In addition to application, the specifications for the fork arch also need to be defined. These specifications can include, but are not limited to, allowable space for the arch, clearance to other fork parts, clearance to bike model, clearance to tire model, and the like.

Further to the application and specifications for the fork arch, engineering metrics also need to be defined. These metrics can include, but are not limited to, material type, manufacturing type, maximum weight, maximum stiffness and stress thresholds, and the like.

In one embodiment, once the application, specifications, and engineering metrics are defined, the information is provided to a topological optimization design process that, in one embodiment, uses the additive process that grows material where it is best utilized to achieve weight, stiffness, and stress thresholds. E.g., one embodiment is a topological optimization that uses the additive process to work for a minimum weight of the component while achieving the requisite stiffness and stress thresholds for the component.

In one embodiment, once the application, specifications, and engineering metrics are defined, the information is provided to a topological optimization design process that, in one embodiment, uses the subtractive process that removes material to achieve weight, stiffness, and stress thresholds. E.g., one embodiment is a topological optimization that uses the subtractive process to work for a minimum weight of the component while achieving the requisite stiffness and stress thresholds for the component.

In one embodiment, once the application, specifications, and engineering metrics are defined, the information is provided to a topological optimization design process that, in one embodiment, uses both the additive and subtractive process to achieve weight, stiffness, and stress thresholds.

In one embodiment, the topological optimization is a materials-based solution. For example, is the component going to be metal, composite, or the like. In one embodiment, each of the categories could have a number of sub categories. For example, a minimal amount of a material that will achieving the requisite stiffness and stress thresholds for the component for a plurality of different materials.

For example, a composite material could be carbon fiber, carbon fiber short string, graphene gyroid, or the like. In one embodiment, the composite material may be in a woven fabric form, mat fabric form, may be preferentially oriented using unidirectional reinforcement manufacturing methods in anticipation of greater stresses in given orientations, or the like.

Examples of different metals could include metals such as, but not limited to aluminum, steel, titanium, magnesium, and the like. In one embodiment, aluminum would have a given weight and shape to meet the stiffness and stress thresholds. Steel would have a different given weight and shape to meet the stiffness and stress thresholds. Titanium would have yet another given weight and shape to meet the stiffness and stress thresholds. Magnesium would have yet another given weight and shape to meet the stiffness and stress thresholds, etc. for any desired material.

In one embodiment, the topological optimization could also include different solutions based on manufacturing capabilities. For example, milling, extrusion, layering, casting, additive manufacturing, or the like.

In one embodiment, the topological optimization could also include different materials for a mixed material component. For example, a chainring could have a spider portion that has a topologically optimized design based on a first material and a chainring outer diameter that has a topologically optimized design based on a second material.

Once the different evaluations were performed, the manufacturing costs could then be evaluated. For example, each component would have a material cost and a manufacturing cost (e.g., milled, extruded, 3D printed, cast, formed, etc.). In one embodiment, the result of the evaluation would be a number of different component material designs that could be used to cover a number of marketing scenarios.

For example, the absolute lightest component could be formed from a material such as graphene gyroid. While the manufacturing costs could make it prohibitive for mass production, it may be a component that a professional team and/or wealthy buyer would purchase.

Another light component could be a titanium component which would have a given price point based on the manufacture and materials cost that may put it in a higher cost bracket.

A composite component would again have a given price point based on the manufacture and materials cost that would also put it in a higher cost bracket.

An aluminum component would have a price point based on the manufacture and materials cost that would put it in a lower cost bracket.

A steel component would have a price point based on the manufacture and materials cost that would likely put it in a lower or even lowest cost bracket.

In one embodiment, the topologically optimized component design analysis could be performed for any number of materials. Once the analysis was made, the manufacturer would be able to determine which materials to use to form the component. In one embodiment, there may be a number of different solutions based on vehicle price point, performance requirements, etc. For example, in a regular bike, the lower cost aluminum component with the new topologically optimized component design might be used. In a mid-range bike, the titanium component with the new topologically optimized component design would be used. In a high-end performance bike, the composite component with the new topologically optimized component design would be used. In the racing team environment, the graphene gyroid topologically optimized component design would be used.

In one embodiment, in addition to the topologically optimized component design being performed for different materials, it would also be performed for one or more different applications. For example, different categories such as a road bike, gravel bike, mountain bike, e-bike, and the like would have different stiffness and stress thresholds. Moreover, within any given category there can be different travel settings (e.g., solid frame, hardtail, full suspension, etc.), wheel sizes, rim sizes, brake types, clearances, and the like.

In one embodiment, once the topological optimization is performed, a topologically optimized component design is obtained. In one embodiment, there may be a number of topologically optimized component designs obtained, where the different designs are based on different materials.

In one embodiment, the topologically optimized component design will go to the industrial design step. For example, the industrial design step is used to evaluate the topologically optimized component design for manufacturability, asthetics, or the like. In other words, to evaluate and/or adjust the topologically optimized design for one or more development realities such as manufacturability, aesthetics or the like.

For example, in one embodiment, the topologically optimized component design might not be manufacturable, might require a design adjustment to be manufacturable, might require a completely new manufacture retooling, or the like.

In one embodiment, the topologically optimized component design might not be aesthetically pleasing, or otherwise have customer appeal.

In one embodiment, if the industrial design step did make manufacturing and/or aesthetic adjustments to the topologically optimized component design, the adjusted topologically optimized component design would then go through a finite element analysis (FEA) for validation. If the FEA validated the adjusted topologically optimized component design, then the design would be sent to the design manufacture step.

In one embodiment, if the FEA validation resulted in an adjustment or modification to the adjusted topologically optimized component design, the FEA modified design would return to the industrial design, and the FEA and industrial process would continue to be iterated until a solution was reached: e.g., an adjusted topologically optimized component design with the appropriate weight, stiffness, aesthetic, and the like.

In one embodiment, when the solution is reached, the topologically optimized component design will be sent to the design for manufacturing step where the manufacturing process for the component design solution would be developed.

Once the manufacturing process was developed, the topologically optimized component design would enter the print/model release process where the component would be manufactured. After that, the component would be assembled and/or packaged for consumption.

In one embodiment, the topological optimization is performed by a computer aided design (CAD) program. In one embodiment, the topologically optimized fork arch 316 is shown in FIGS. 3-4B and it puts the material in structural places that are defined to optimize the material. As seen in FIG. 4A, in one embodiment, the topologically optimized fork arch 316 design may not be manufacturable and/or may not be aesthetically pleasing (e.g., nice to look at.).

As described herein, in one embodiment, if the topologically optimized design is manufacturable but not aesthetically pleasing, it may still be manufactured as is to provide a "best solution" component.

In one embodiment, as described herein, if the topologically optimized design is manufacturable but not aesthetically pleasing, it will go through the industrial design and FEA iterations until an aesthetically pleasing topologically optimized design is reached. This would be an example of a "best aesthetic solution" component.

In one embodiment, as described herein, if the topologically optimized design is not manufacturable (or not manufacturable using a company's available manufacturing techniques), it will go through the industrial design and FEA iterations until it reaches a manufacturable design. This would be an example of a "best solution based on manufacturing capabilities" component.

In one embodiment, as described herein, if the topologically optimized design is not manufacturable (or not manufacturable using a company's available manufacturing techniques), it will go through the industrial design and FEA iterations until it reaches a manufacturable design. However, if the topologically optimized manufacturable design is not aesthetically pleasing, it will again go through the industrial design and FEA iterations until an aesthetically pleasing topologically optimized manufacturable design is reached. This would be an example of a "best aesthetic solution based on manufacturing capabilities" component.

For example, FIGS. 5A-5C illustrate an aesthetically pleasing topologically optimized manufacturable crown component, shown in accordance with one embodiment.

Although a fork, fork arch, and crown are shown, it should be appreciated that in one embodiment, one or more components of a vehicle could be designed using the topologically optimized design process described herein. Other components include, but are not limited to, seatposts, hub shells, cranks, handlebars, levers, rotors, gears, shock mounts, shock bodies, wheels, roll cages, hulls, etc.

Thus, unlike prior design methods, the present technology provides a seed design (e.g., the topologically optimized component design) as a starting point for the finalized component design that is then evaluated and adjusted for asthetics and/or manufacturability. Moreover, by performing the topologically optimized component design for a number of different materials, the "seed design" would be available for different material types, different cost tiers, different performance tiers, super high end performance components, and the like.

For example, the present technology will allow for a component design, e.g., a topologically optimized fork arch 316 in this example, that will look different based on the material used. In other words, as well as providing a material saving design, in one embodiment, each material's "seed design" would have its own unique design characteristics. In one embodiment, the unique design characteristics would be identifiable from looking at the component. For example, a rider having a titanium fork arch would be able to identify another bike with a magnesium fork arch, or another bike with a composite fork arch, or a graphene gyroid design, etc. The rider would be able to admire the component, ask about the component, discuss performance and/or style differences with the other bike rider, etc.

As such, the different component weight and/or designs asthetics could be used as advertising, reasons for an upgrade, and the like.

In one embodiment, the topological design could be based on a best weight for a predefined stiffness. In another embodiment, the topological design would provide a weight reduction for an existing component, while providing an increased level of predefined stiffness. In yet another embodiment, the topological design would provide no weight reduction for a component, while providing a maximum increase in a level of stiffness, strength, durability, etc.

Thus, for example, in a mountain bike component design, the weight reduction would not be as high of a priority as durability, stiffness, endurance, or the like. In one embodiment, such as a mountain bike component design, there may be a need for an increased level of stiffness but the topological design can provide the design that meets the increased level of stiffness while also reducing the component weight.

In another example, such as a road bike component design, the weight reduction would be of a higher priority than any increase in stiffness, durability, endurance, or the like of an existing component. As such, the component stiffness requirements would be set at a predefined level and the topological design would then work on providing the lightest design that meets the stiffness requirements.

Again, the topological design would be able to provide such weight, stiffness or other predefined design limitations across a number of different materials to provide a number of different solutions that may be established as a cost tier, a performance tier, etc. and wherein each of the different material designs could be individualized to provide the readily and visually identifiable component types. E.g., an aluminum component looks like regular, while a composite component looks sleek/futuristic/intimidating, etc.

The foregoing Description of Embodiments is not intended to be exhaustive or to limit the embodiments to the precise form described. Instead, example embodiments in this Description of Embodiments have been presented in order to enable persons of skill in the art to make and use embodiments of the described subject matter. Moreover, various embodiments have been described in various combinations. However, any two or more embodiments could be combined. Although some embodiments have been described in a language specific to structural features and/or methodological acts, it is to be understood that the subject matter defined in the appended claims is not necessarily limited to the specific features or acts described above. Rather, the specific features and acts described above are disclosed by way of illustration and as example forms of implementing the claims and their equivalents.

What we claim is:

1. A method for topologically optimized component design, said method comprising:

receiving at least one application parameter for a component from a group consisting of: a travel, a wheel size, a bike type, a weight target, and a stiffness target;

receiving at least one specification for said component from a group consisting of: an allowable space, a clearance to other parts, a clearance to a vehicle model, and a clearance to a tire model;

receiving at least one engineering metric for said component, said at least one engineering metric from a group consisting of: a material type, a manufacturing type, a maximum weight, a minimum or maximum stiffness, and a stress threshold; and utilizing said at least one application parameter, said at least one specification, and said at least one engineering metric to generate a topologically optimized component design from at least one material;

utilizing said at least one application parameter and said at least one specification to generate a topologically optimized component design from at least one material;

evaluating said topologically optimized component design for manufacturability;

performing an industrial design modification to obtain a manufacturable topologically optimized component design when said evaluation for manufacturability results in said topologically optimized component design being unmanufacturable or otherwise overly constrained by available manufacturing processes;

performing a finite element analysis (FEA) on said manufacturable topologically optimized component design;

performing a plurality of iterations through said industrial design modification and said FEA until an acceptable modified topologically optimized component design is achieved;

generating a manufacturing process for said acceptable modified topologically optimized component design; and utilizing an additive process and a subtractive process to physically generate said topologically optimized component design based on the acceptable modified topologically optimized component design.

2. The method of Claim 1 further comprising: generating a manufacturing process for said topologically optimized component design when said evaluation for manufacturability results in said topologically optimized component design being manufacturable.

3. The method of claim 1 further comprising: performing an aesthetics evaluation of said topologically optimized component design.

4. The method of claim 3 further comprising: generating a manufacturing process for said topologically optimized component design when said topologically optimized component design passes said aesthetics evaluation.

5. The method of claim 3 further comprising: performing an industrial design modification to obtain an aesthetically modified topologically optimized component design when said topologically optimized component design fails said aesthetics evaluation.

6. The method of claim 5 further comprising: performing a finite element analysis (FEA) on said aesthetically modified topologically optimized component design; and performing a plurality of iterations through said industrial design modification and said FEA until an acceptable aesthetically modified topologically optimized component design is achieved.

7. The method of claim 6 further comprising: generating a manufacturing process for said aesthetically modified topologically optimized component design.

* * * * *